United States Patent [19]

Nance et al.

[11] 3,872,255

[45] Mar. 18, 1975

[54] DIGITAL COMMUNICATIONS SYSTEM WITH TIME-FREQUENCY MULTIPLEXING

[75] Inventors: W. Franklin Nance, Oakdale; Robert L. Shacklett, Fresno, both of Calif.

[73] Assignees: NS Electronics, Fresno, Calif.

[22] Filed: May 14, 1973

[21] Appl. No.: 359,864

[52] U.S. Cl. ....... 179/15 BM, 179/15 A, 179/15 BC

[51] Int. Cl. ..... H04b 7/18

[58] Field of Search ......... 179/15 BA, 15 A, 15 BC, 179/15 BM; 325/38 B; 332/11 P

[56] References Cited

UNITED STATES PATENTS

| | | | |
|---|---|---|---|
| 3,239,761 | 3/1966 | Goode | 179/15 BA |
| 3,562,431 | 2/1971 | Inose | 179/15 BA |
| 3,659,053 | 4/1972 | Low | 179/15 BC |

OTHER PUBLICATIONS

IEEE Spectrum, August 1967, Multiple-Access Discrete Address Communication Systems, 179-15BA.

*Primary Examiner*—David L. Stewart
*Attorney, Agent, or Firm*—Gregg, Hendricson & Caplan

[57] ABSTRACT

A communication system employing a time-frequency matrix for separately addressing discretely, words derived from sequentially sampled inputs and signal inputs indicating direction of change of input per sampling period to maximize transmission per bandwidth. The system precludes phase problems and loss of information.

13 Claims, 10 Drawing Figures

DIGITAL COMMUNICATIONS SYSTEM WITH TIME-FREQUENCY MULTIPLEXING

BACKGROUND OF INVENTION

A wide variety of systems have been developed for transmitting information as, for example, over telephone channels with common objectives thereof being the maximization of information transmitted for a limited or given bandwidth and minimization of information loss or distortion in transmission. Among the developments in this field are PCM (Pulse Coded Modulation) and RADA (Random Access Discrete Address) as well as refinements thereon.

In order to make maximum use of transmission media, multiplexing techniques have been devised wherein more than one communication channel can occupy the same medium. Multiplexing consists of modifying the input information on each channel in some unique way so that all channels can coexist on the transmission medium, the separation of each channel's information taking place at the receiving end by employing an inverse of the original modification process.

Both time and frequency division multiplexing have been employed in communications systems. Time division multiplexing consists of assigning each channel a unique portion of a repeated time sequence so that all channels share the same system facility. Frequency division multiplexing consists of assigning each channel to a unique band of frequencies in the frequency domain of the system.

A combination of time and frequency division multiplexing is employed in RADA systems. A RADA channel is defined or designated by assigning to it a single address consisting of a unique combination of slots or holes in a two-dimensional time-frequency matrix. A single address is thus comprised as a unique combination of time and frequency in the above-noted matrix. The receiving end of the RADA channel is preprogrammed to recognize only the frequency bursts occurring at those frequencies and in those time slots specified by the channel address. Information is conveyed on the RADA channel by repeated use of the single address in coded patterns. An improved RADA system is disclosed at pages 390 et seq. of the April 1963 Proceedings of the IEEE.

A system extensively employed in telephone communication is that of pulse coded modulation (PCM), where user inputs are first pulse amplitude modulated for detecting each discrete level of user input and pulse coding serially generates a corresponding set of pulses comprising a unique binary code. Time sharing is employed within each sample interval to divide this interval into segments which are to be occupied by a set of the pulses for each user input to thus produce a time sharing multiplex transmitter. A PCM receiver gates the input set of pulses to an appropriate path including a pulse amplitude demodulator to reconstruct the original user input. It has been determined that a minimum rate of sampling for such systems is at least two times the highest frequency of user input. Thus, for a 3 KHz sign wave to be pulse amplitude modulated and reconstructed with reasonable fidelity in a receiver, a sampling frequency rate of at least 6 KHz is required.

A further multiplexing system comprises a recent adaptation of an older concept termed "delta modulation" originally appearing in French Pat. No. 932,140 of August, 1946. In such a system user inputs are sampled and, if a detected difference in user input amplitude exists between successive sample intervals, the change is detected and a corresponding pulse is generated and transmitted. Each sample interval, as well as pulse duration, is quite short as, for example, a small fraction of a cycle of the highest frequency of user input. A modification of delta modulation is set forth in U.S. Pat. No. 2,605,361 of July 29, 1952 entitled "Differential Quantization of Communication Signals."

The present invention provides a communication system having greater resolution and more efficient use of a time-frequency matrix than previously known systems.

SUMMARY OF INVENTION

A communication method and system providing signal processing and simultaneous transmission of many user inputs over a single path of a given media that is particularly advantageous for use in both subscriber and toll multiplex applications in the telephone industry. The transmitter of the present invention performs three main functions with the first of these being the conversion of user inputs into corresponding digital form for further processing and this is accomplished by the use of a delta modulator in each user's information path. The second transmitter function is stretching the time required for each delta modulator output sampling interval, and the third function of the transmitter is the conversion of the stretched digital information into corresponding time-frequency matrix addresses. These addresses consist of the selection and transmission of RF bursts which occupy unique slots in the time-frequency matrix. The receiver of the present method and system reverses the process of the transmitter.

Sampling is herein accomplished by delta modulation producing bipolar pulses that are herein converted to unipolar pulses indicating input amplitude change in excess of a predetermined minimum and polarity pulses are generated to indicate the direction of amplitude change during each sampling period. Sampling is carried out at a rate which is well in excess of, as for example, five times the maximum frequency of user input signal variation. Delta modulators are employed in groups herein and, considering a group of two, there is formed a two-bit binary word by combining the paired outputs of these two modulators during each delta sample interval. These binary words are stored in registers and have a direct correspondence to the rate of change of the original inputs but do not contain pulse sign information. Separate registers are employed to store pulse sign information.

The binary words produced from combinations of delta modulators are, for the example of paired modulators, stored in either one or another of alternate registers which permits the simultaneous operation of sequential storage in one set of registers while the other set is used for the stretched output. This stretching of the short duration sample pulses is advantageous in saving of bandwidth of the transmitted signals.

The outputs of the storage registers are gated into an address assignment matrix which operates RF oscillators to produce RF bursts in a time-frequency matrix. Polarity pulses are also coded in accordance with the time-frequency matrix to produce RF bursts at particular times as addresses. The information and polarity addresses are transmitted through a transmission medium to a receiver wherein reverse processing from that of the transmitter reconstructs the original information.

The transmitter of the present invention employs a sensing system to preclude transmission of a particular address when same is already being transmitted on the system in order to preclude, or at least limit, phase problems and loss of information.

DESCRIPTION OF FIGURES

The present invention is illustrated as to a particular preferred embodiment thereof in the accompanying drawings wherein.

DESCRIPTION OF PREFERRED EMBODIMENT

It is to be appreciated that the present invention is adapted to operate with a substantial number of users and, in order to clarify the description of the present invention, the Figures of the drawings are limited into a small number of user input lines in order to avoid redundant illustration. It is also noted that the transmitter of the present invention carries out three main functions which may be generally termed as: (1) converting inputs into digital form by a delta modulator, (2) combining groups of sequentially-generated delta modulator outputs and producing pulses therefrom which are time-stretched relative to the delta sampling intervals and are then processed concurrently by the third transmitter function, and (3) converting the stretched digital information into corresponding time-frequency matrix addresses. It is furthermore noted that the addresses result from the selection and transmission of RF bursts occupying unique slots in a time-frequency matrix, as further described below. A reverse of the foregoing is carried out by the receiver of the present invention.

Figure 1:
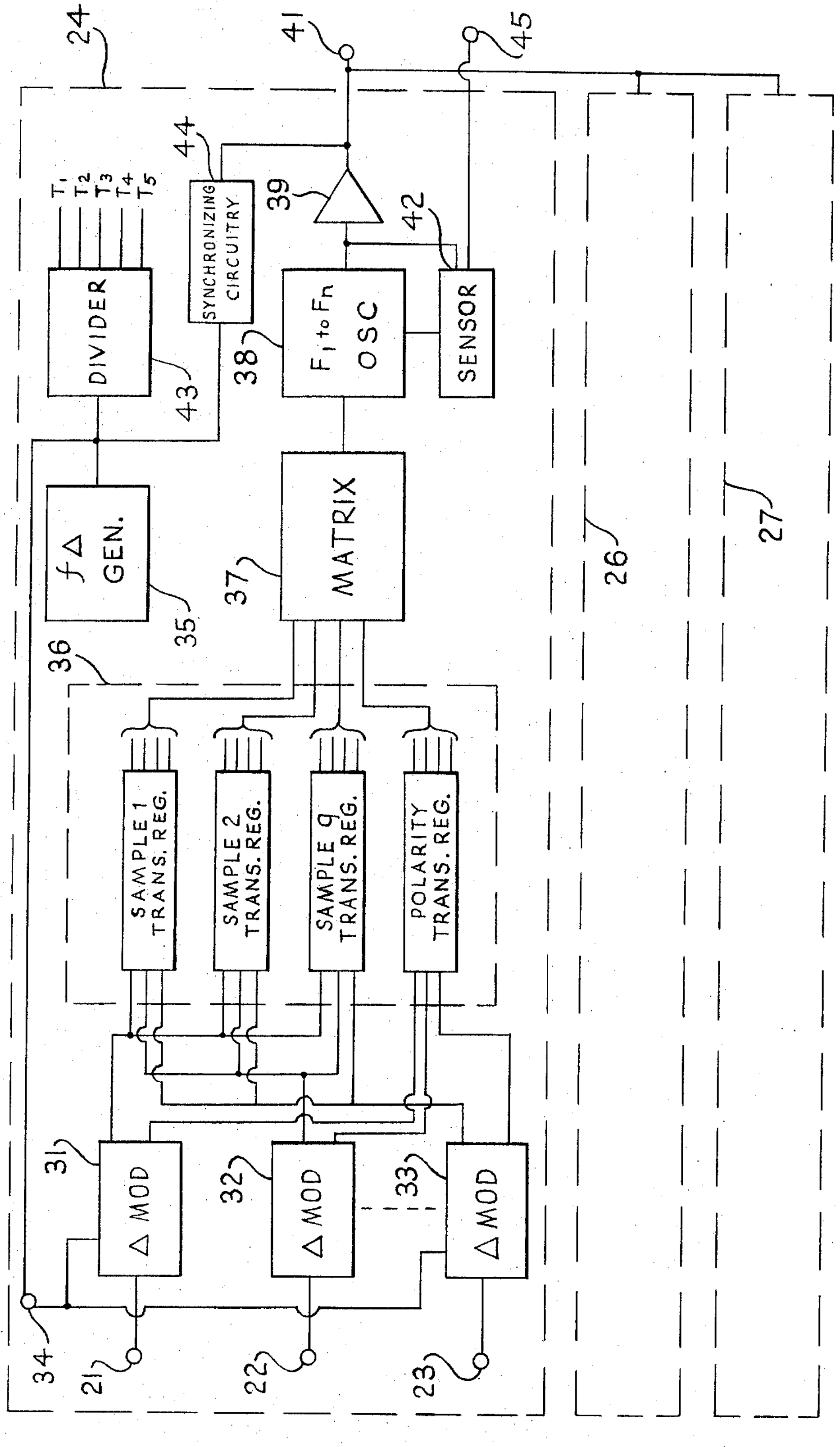
FIG. 1 is a block diagram of a transmitter in accordance with the present invention.

Referring first to FIG. 1 of the drawings, there are shown three user input terminals 21, 22 and 23 for a single module 24 of the transmitter. Additional modules 26 and 27 are indicated in FIG. 1 and it is to be appreciated that there are $p$ number of channels per module and there are M/$p$ number of modules per system, where M represents the total number of users. Information applied to the input terminals or lines 21 to 23 of module 24 is applied to delta modulators 31, 32 and 33. These delta modulators are also connected to a terminal 34 receiving a signal from a generator 35 having a frequency $f_{\Delta}$, which is the delta modulation sample rate. The delta modulators are further described below in connection with FIG. 3. The first internal operation of the delta modulators is the production of either a positive pulse, a negative pulse or no pulse, depending upon the rate of change of the user input amplitude during the sampling interval, as established by $f_{\Delta}$. A typical sampling rate may be 50 KHz. The second operation of the delta modulators is to produce unipolar pulses for utilization in the following storage section of the transmitter and, inasmuch as the polarity of the pulses is thus lost, a second delta modulator output is provided to identify the slope polarity, i.e., the direction in which the input signal is varying in order to have produced the delta modulator output pulse.

The user inputs at terminals 21, 22, 23, etc. of the transmitter have a limited frequency range which may, for example, be limited to 5 KHz and this may be accomplished by the provision of low-pass filters in the user lines to the transmitter. This frequency range is greater than the frequency range of conventional transmission lines which is normally of the order of 3 KHz and has been found to be quite adequate for voice transmission and other applications. With this 5 KHz limitation it will be seen that a 50 KHz sampling rate provides for sampling each cycle of the highest frequency input 10 times. Clearly this sampling rate is adequate to produce digital representations of analog signals that may be readily returned to analog form without undue distortion. It is noted, however, that the examples of frequencies set forth above are not intended to be limiting.

The pulsed information from the delta modulators is applied to a storage and transfer circuit 36, illustrated in detail in FIG. 5 and further described below. Outputs from this circuit 36 are applied to an address assignment matrix 37 having the output thereof applied to a frequency generator circuit 38 that applies the output through a transmitter amplifier 39 to a transmitter output terminal 41. Further details of the matrix and frequency generation are illustrated in FIG. 6 and it is noted that frequency sensing circuitry 42 controls the frequency generation from a receiver input terminal 42, as further described in connection with FIG. 6.

The additional modules of the system, identified by numerals 26 and 27 in FIG. 1, are duplicates of the module 24 briefly described above and each employs the same frequency-time matrix with different exclusive addresses.

A sine wave generator 35 is employed by the delta modulators as a sampling frequency source and, additionally, gating and timing pulses employed in the stretching circuitry to be described below, are also derived from this sine wave. The generator 35 is shown to be connected to a divider and gating circuit 43 which may incorporate a shift register having five places, for example, to produce a timed pulse for each of five sequential sample intervals and, additionally, a push-pull or complementary frame timing signal comprising two simultaneous signals of symmetrical square wave shape each lasting for five sample intervals but having opposite polarities for purposes described in connection with FIG. 5. The generator 35 is also shown to be connected to synchronizing circuitry 44. Inasmuch as there exists in the art a variety of methods which may be employed to synchronize the timing signals used in the transmitter with those needed in the receivers, no additional detail for said synchronizing methods and circuitry is provided in the description of this present invention.

Figure 2:
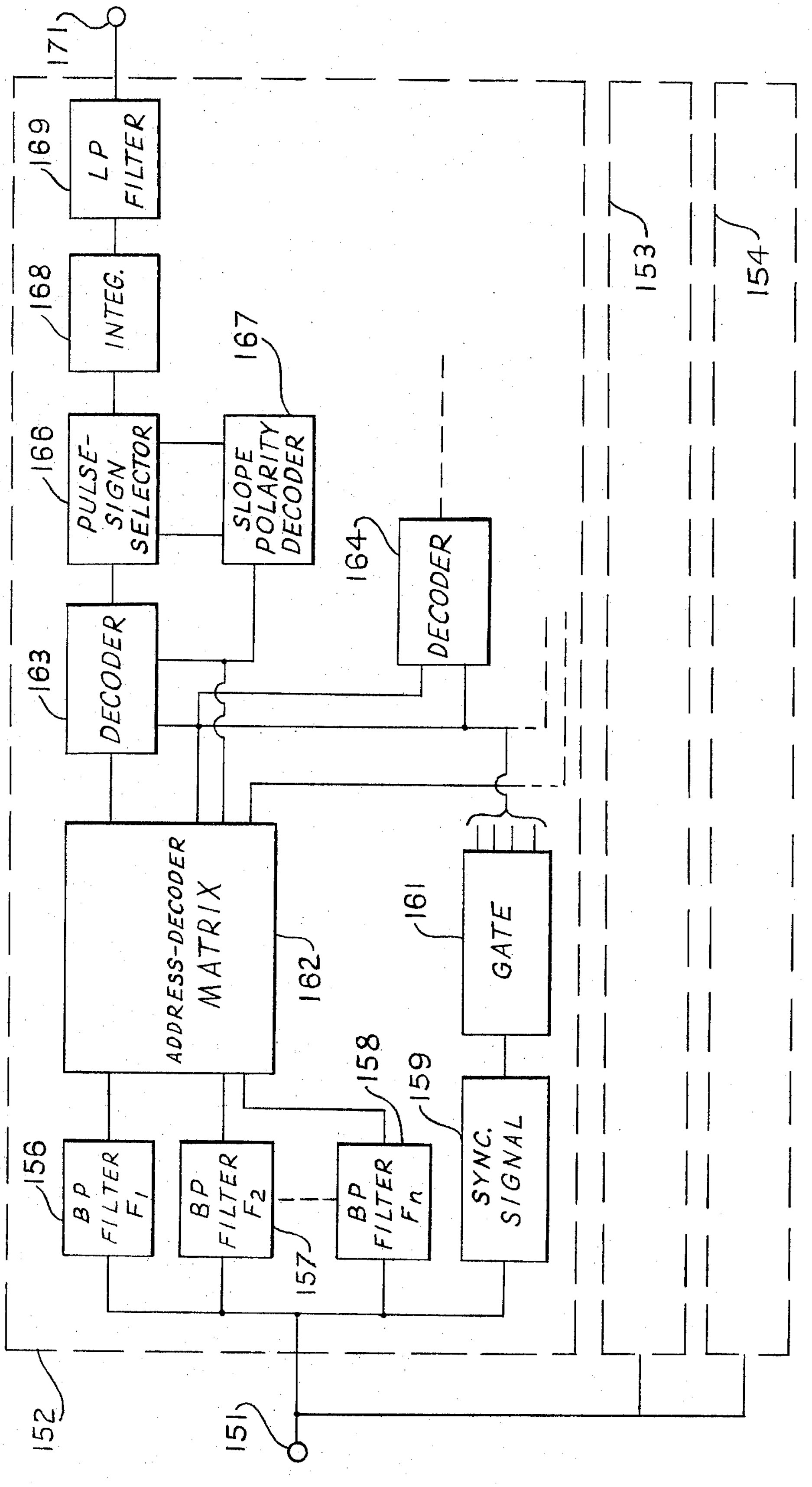
FIG. 2 is a block diagram of a receiver in accordance with the present invention.

The receiver of the present invention, generally illustrated in FIG. 2, receives a composite output of the transmitter of FIG. 1 at input terminal 151 and essentially reverses the three functions of the transmitter identified above. The receiver functions are: (1) identify and separate each of the user addresses as required in each user path, (2) convert the concurrently received and stretched samples back into bipolar narrow sequentially occurring pulses similar to the manner in which they were generated in the delta modulators of the transmitter, and (3) demodulate the delta samples by integration and then, by low-pass filtering, develop the original user wave shape in the user output path. Circuitry of the receiver of FIG. 2 is discussed below in connection with this Figure and the additional FIGS. 9 and 10.

Figure 3:
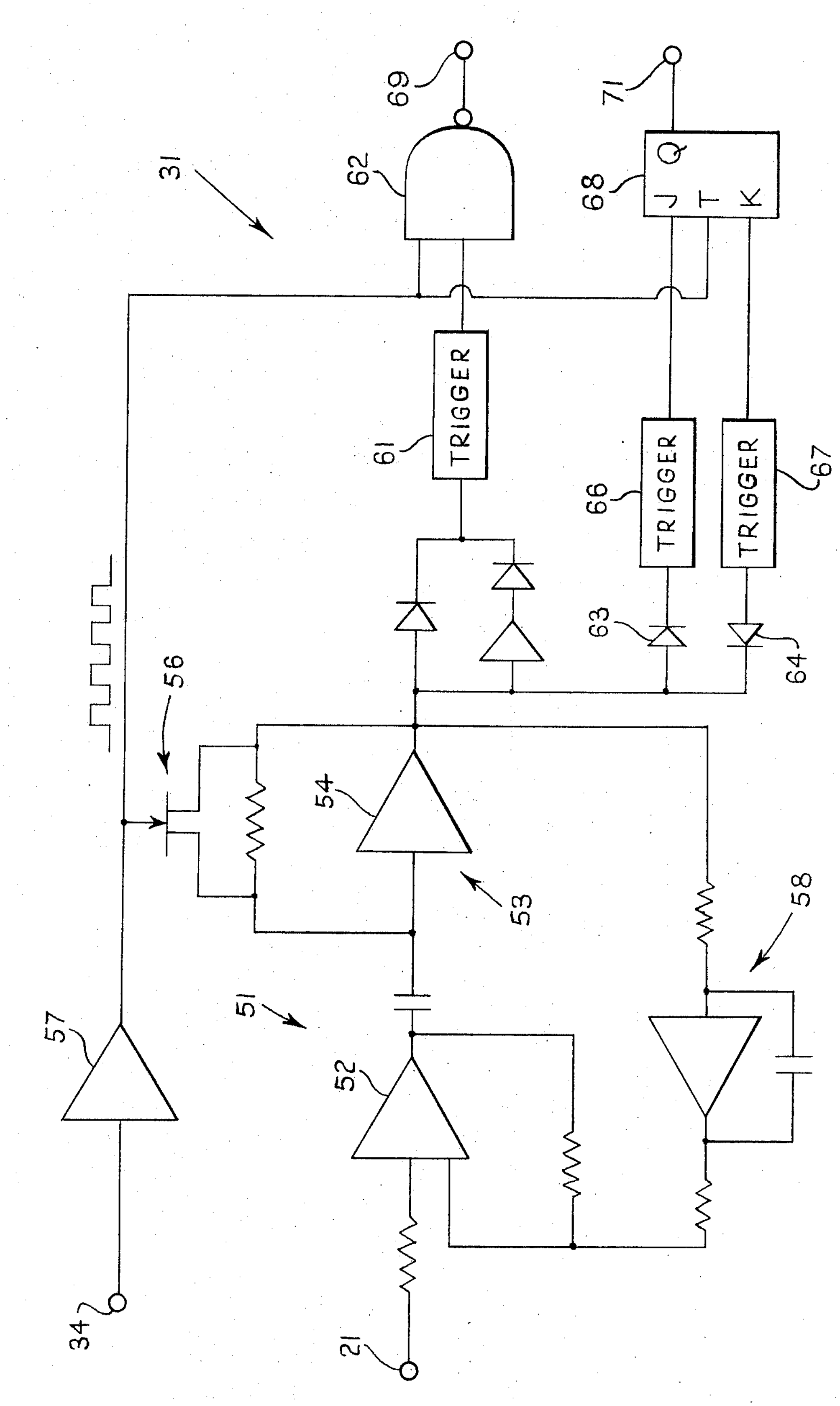
FIG. 3 is a block diagram of a delta modulator as employed in the transmitter of the present invention.

Referring now to FIG. 3, there will be seen to be illustrated therein a delta modulator 31 as employed in the transmitter of the present invention. A delta modulator is known in the art to include a typical error loop consisting of a comparator, a differentiator and an integrator, and producing an output which is either a positive pulse, a negative pulse or no pulse at all, depending upon the rate of change of amplitude of the signal at the input terminal 21. The comparator 51 is illustrated to be provided as a differential amplifier 52 having appropriate connections for comparison and the differentiator 53 includes a switch controlled operational amplifier 54. The amplifier 54 is operated by a transistor switch 56 controlled by the output of an overdriven amplifier 57 having the input connected to the reference frequency terminal 34. As noted above, there may be applied a 50 KHz signal to this terminal 34 with the output of the amplifier 57 comprising a square wave with a pulse frequency of 50 KHz. The input signal at terminal 21, i.e., the user input information, has a limited frequency range, provided for by the use of a lowpass filter as noted above, and is amplified in the comparator 51. If the amplitude of this analog input changes during the sample interval, as determined by the frequency at terminal 34, the differentiator 53 produces an output pulse, the polarity of which is dependent upon the slope polarity of the information, i.e., whether or not the input signal is increasing in amplitude or decreasing in amplitude. The output of the differentiator 53 is applied through an integrator 58 back to a second input of the differential amplifier 52 so that the output thereof is actually related to the change in input signal during each sampling period. The sampling rate is chosen sufficiently high so that little, if any, information is lost in this conversion to pulsed form. With a user input frequency limitation of 5 KHz, it will be appreciated that a 50 KHz sampling rate is sufficiently high to accomplish this desired result.

Further with regard to the delta modulator, it is noted that the bipolar pulses appearing at the output of the differentiator 53 are converted to unipolar pulses by application to a trigger circuit 61 such as, for example, a Schmidt trigger. The trigger circuit 61 will produce an output pulse for each pulse output of the differentiator and the trigger output is applied along with the square wave signal at the sampling rate from the amplifier 57 as inputs to a sample gate circuit 62. The output of this gate circuit 62 thus comprises pulses indicating the rate of change of the input signal at terminal 21; however, it is noted that these pulses do not indicate the direction of change. In accordance herewith, the slope polarity, i.e., the direction of amplitude change of input signals, is handled by a separate pulse processing, where the output of the differentiator 53 will be seen to be connected through oppositely poled diodes 63 and 64 to a pair of trigger circuits 66 and 67. The trigger circuits 66 and 67 have the outputs thereof applied to the JK terminals of a conventional JK flip-flop 68. The reference frequency signal in the form of pulses from the amplifier 57 is applied to the T terminal of the flip-flop 68 to produce from the terminal Q thereof a binary 0 or 1 signal denoting a positive slope or negative slope. As a convenience in following the description hereof in connection with the different Figures, the output terminals of the delta modulator 31 are identified by the numerals 69 and 71. There is an advantage in separating the polarity information from the modulation information because the modular organization used in the present invention allows the polarity information to be transmitted with fewer RF bursts than would be necessary if they were combined. This is further discussed below.

Figure 4:
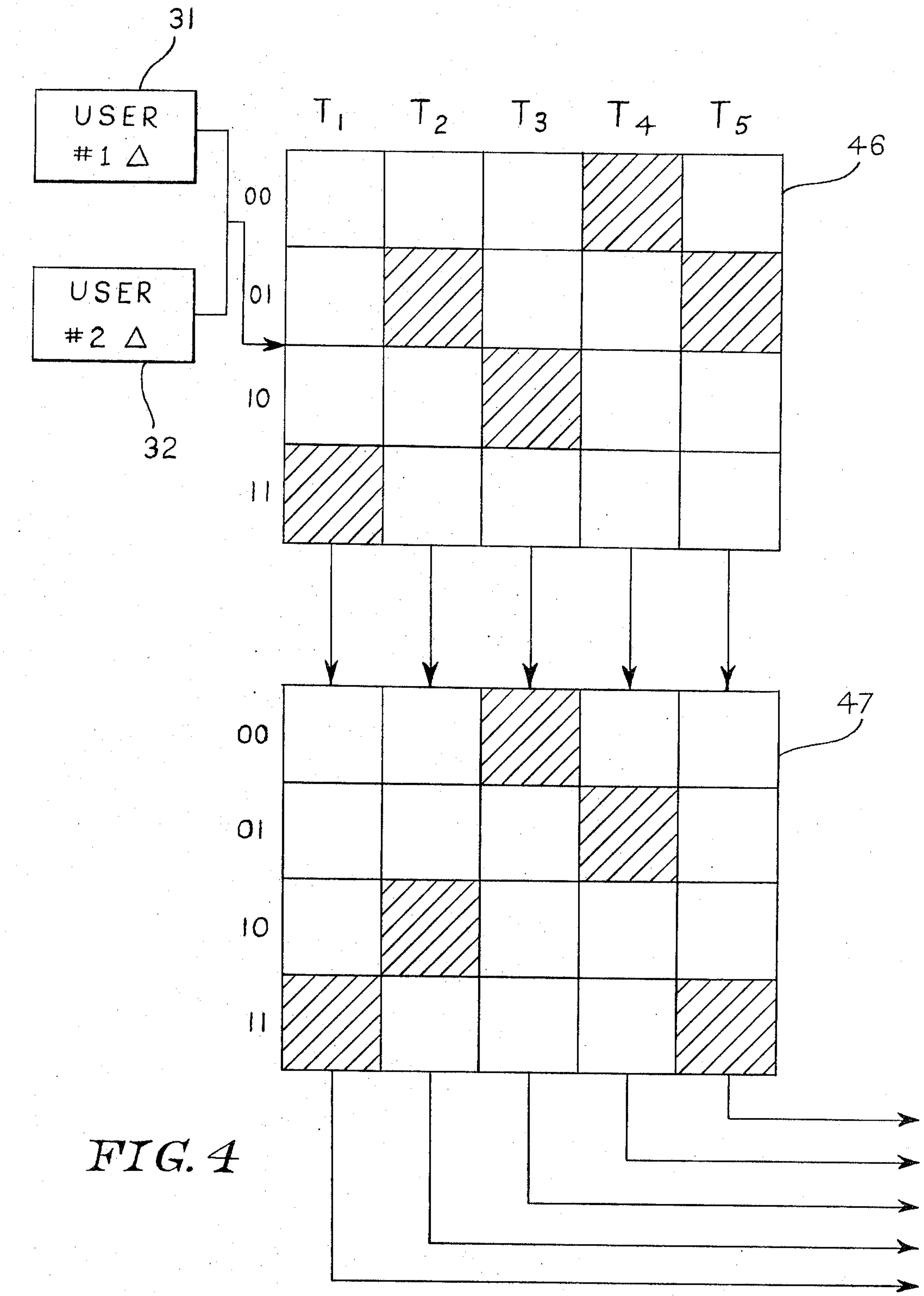
FIG. 4 is a symbolic representation of the content of a storage and transfer register as employed in the transmitter of FIG. 1.

Reference is now made to FIG. 4 which illustrates in symbolic form how the pulsed information from a group of two delta modulators, 31 and 32, operated together, is processed to provide the time-stretched output pulses which were referred to above. Outputs from the two delta modulators may be represented by a sequence of the binary digits 1 or 0 representing, respectively, the presence or absence of a unipolar delta modulator output pulse. In this example, the two delta modulators are each to be considered as having generated two successive sequences of five binary digits, each sequence occupying an interval of time designated herein as a frame. The output from user No. 1 may be illustrated by the sequence 11001 for Frame 1 and 10100 for Frame 2, and the output from user No. 2 may be illustrated by the corresponding sequences 10101 and 11001. The time sequence of the digits is to be understood as going from left to right. The first digit in Frame 1 for each user is a 1, the second digit is a 1 for user No. 1 and a 0 for user No. 2, etc. It will be seen that grouping two delta modulators together implies that their outputs form a two-bit binary word having four possible combinations which are 00, 01, 10 and 11. In the five sampling intervals of Frame 1 the binary words formed, in the order of their occurrence, are 11, 10, 00, 01, 11. For Frame 2 the words are 11, 01, 10, 00, 01. (The first digit of each word is associated with user No. 1.) FIG. 4 shows symbolic representations of two registers or accumulators 46 and 47. Each accumulator contains four flip-flop circuits for each delta sampling interval in the frame to provide storage locations for the four possible binary words that are produced by the paired delta modulators. The state of each flip-flop is shown for that instant of time corresponding to the fifth sampling interval of the second frame. (Crosshatching indicates which flip-flops are being used.) Accumulator 47 contains all five of the binary words produced during Frame 1, having received them at the beginning of Frame 2 from accumulator 46. During Frame 2 accumulator 47 "reads out" the words stored in it to the addressing circuitry of the transmitter thus accomplishing a pulse stretching or lengthening relative to the shorter pulses produced in each delta sampling interval. After transferring its contents to accumulator 47 at the beginning of Frame 2, accumulator 46 is then ready to store the next sequence of five words from the delta modulators during the remainder of Frame 2.

Figure 5:
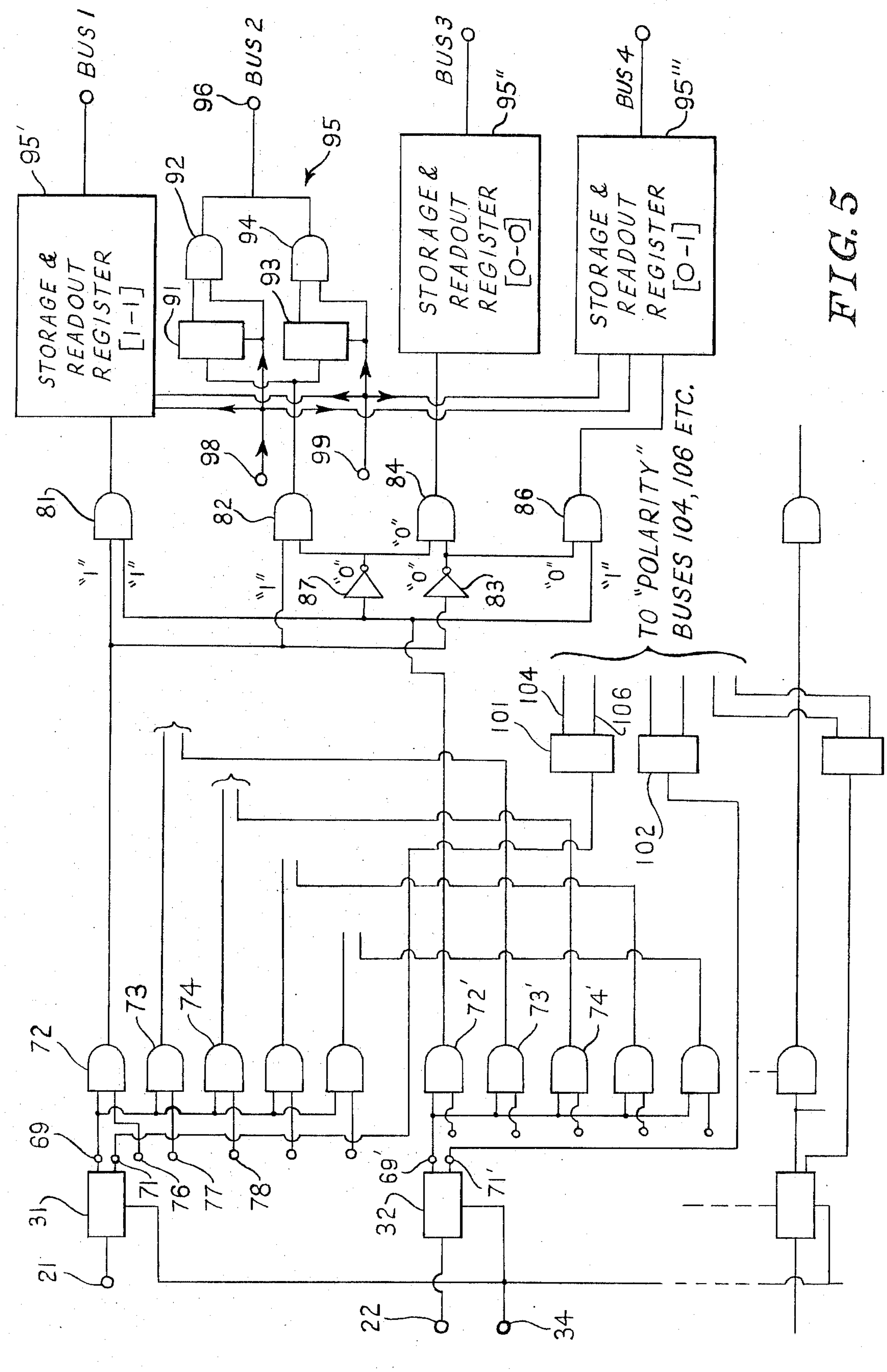
FIG. 5 is a circuit diagram of storage and transfer circuitry as employed in the transmitter of FIG. 1.
Figure 6:
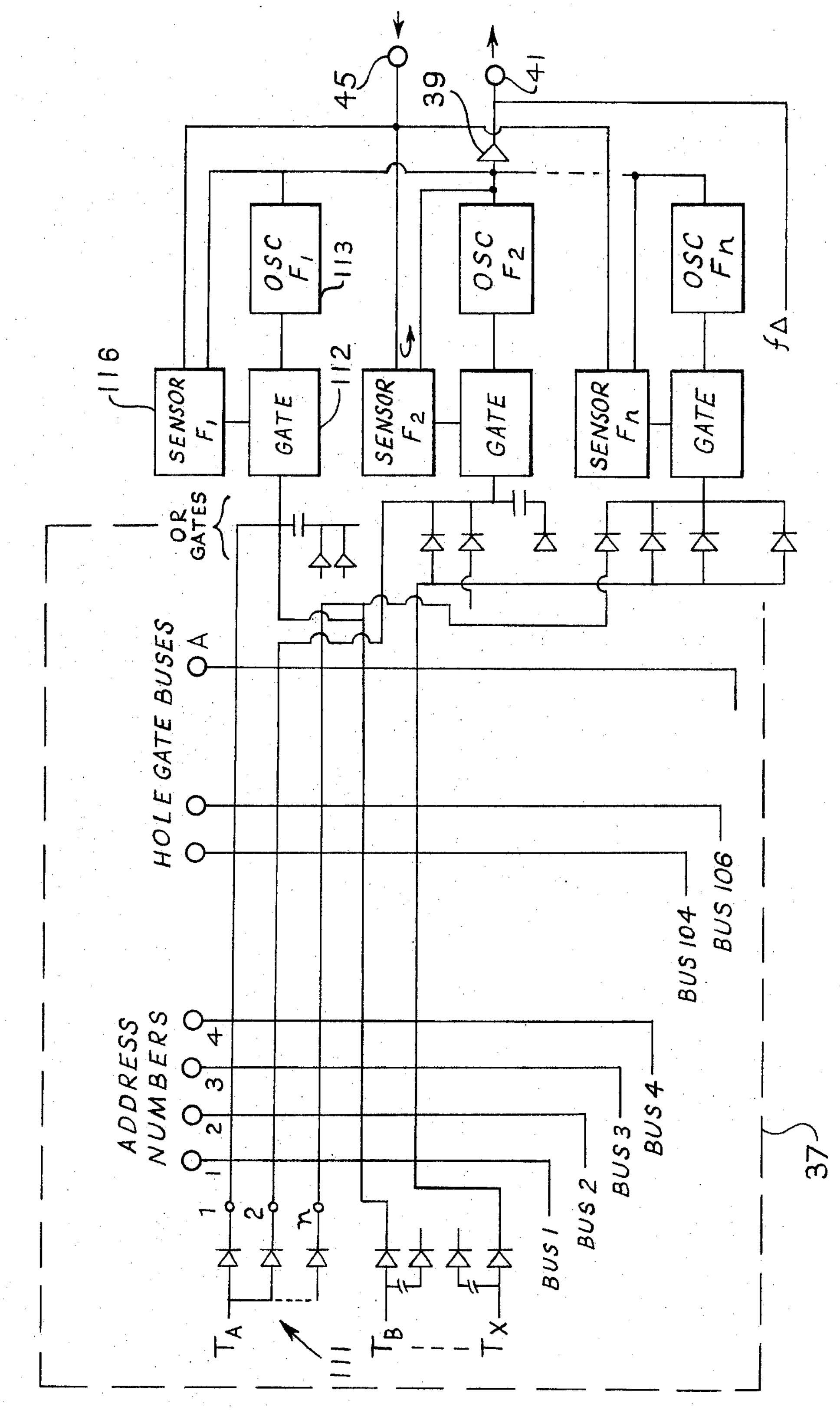
FIG. 6 is a diagramatic illustration of an address assignment matrix and associated circuitry as employed in the transmitter of FIG. 1.

Reference is now made to FIG. 5 illustrating, in part, details of bit storage and gating circuitry operating upon the two-bit binary word formed by the pairing of delta modulators 31 and 32, for example. It is again noted that, in the illustrated and described embodiment of the present invention, pairing of delta modulators is employed; however, the invention is not limited to combinations of two and may, instead, incorporate combinations of three or more. The output terminal 69 of delta modulator 31 is applied to the first inputs of a plurality of AND gates 72, 73, 74, etc., with these AND gates having the second inputs applied from terminals 76, 77 and 78, etc., to which there are applied pulses at $T_1$, $T_2$, $T_3$, etc. The source of these applied pulses, $T_1$ to $T_5$, has been described above in connection with FIG. 1. For continuity of thought, these timing pulses $T_1$, $T_2$, $T_3$, etc., are employed as gating signals and occur sequentially at AND gates such as 72 and 72' at the input, at time $T_1$ which corresponds to (or is coincident with) the first sample interval in each frame, and then AND gates 73 and 73' during the second sample interval using $T_2$ and so on for $q$ number of gates, where in this example, $q$ is equal to 5. This sequential time gating is required in order to pass only the samples which occur during the corresponding time gate in each storage path. For example, in the description which immediately follows, one such path is traced out in accordance with the functional signal flow, where following the stretching, the processed user input is contained in an exclusive (unique) address in the F-T matrix output.

Continuing with the description of FIG. 5, during the first sampling period $T_1$, the 1 bit from the delta modulator 31 in the foregoing example is time-gated through the gate 72. Delta modulator 32 has the same circuitry connected to the output thereof as delta modulator 31 and in FIG. 5 these elements are identified by the same numerals with primes added. Thus, at the same time that AND gate 72 operates to pass the 1 bit of the binary word 10, the 0 bit from delta modulator 32 is time-gated through AND gate 72'. Considering now only the first bit of the binary word, it is noted that AND gate 72 is connected to an input of first and second AND gates 81 and 82 and through an inverter 83 to an input of an AND gate 84 and a further AND gate 86. The output of AND gate 72' connected to delta modulator 32 is connected to the other input of AND gate 81 and AND gate 86 and is connected through an inverter 87 to the other inputs of AND gates 82 and 84. Therefore it can be seen that AND gate 81 is the path for the binary word 11 as well as AND gates 82, 84 and 86 being the paths for binary words 10, 00 and 01, respectively. Each of the AND gates 81, 82, 84 and 86 have the same circuitry connected to the outputs thereof and considering, for example, the output of AND gate 82, it is noted that same is connected to a flip-flop 91 having the output thereof connected as one input to an AND gate 92. The output of AND gate 82 is also connected as an input to a flip-flop circuit 93 having the output thereof connected to an AND gate 94 with the outputs of the AND gates 92 and 94 connected together to a terminal 96. It will be seen that each of the AND gates 81, 82, 84 and 86 are connected to pairs of flip-flops or registers employed to store a single binary 1 or 0 bit, which is a representation of a true or false state, respectively, of one of the two-bit binary word combinations that is possible to be generated, as described in connection with FIG. 4 above, where the single 1 is stored for $q$ intervals and, additionally, where $q$ is a number of delta pulses per frame and where 0 is one of the binary states and 1 is the other. In this illustrated and described embodiment of this present invention where pairing of delta modulators is employed, four flip-flops, 95, 95', etc., are needed for storing one of the four possible combinations of bits for each sampling interval. In general, if $r$ delta modulators are sub-grouped together, and if $q$ sampling intervals are employed, $2^r q$ flip-flops would be needed for storing one frame of modulation information. As noted in the description of FIG. 4 above, an equivalent number of flip-flops is required for "reading out" any information which was stored during the previous frame.

In order to stretch the delta pulses, each pulse is stored in either a first or second flip-flop. Continuing with the foregoing example where the 10 word to be stored appeared at flip-flop or register 91 as a 1 because gate 82 passed the signal and because a frame pulse appearing at terminal 98 enabled the flip-flop 91 to respond, the output of flip-flop 91 would be at a binary 1. This processing is shown in FIG. 4, described above, where the same two-bit word of the foregoing example, i.e., binary 10 word, was stored in an accumulator which can now be compared to flip-flop 91 in FIG. 5, as a single 1 binary bit. It was also noted above in the description of FIG. 4 that any of the states of the paired bits that occurs, whether a 00, a 11, a 01 or the 10, it is represented in a separate path as a single 1 bit for storage and use in the generation of a corresponding unique address in subsequent circuitry. In this preferred embodiment, only one pair of generated bits occurs at any one time; therefore, only one of the output lines from the storage registers will be at a logic 1 and all others will be at a logic 0. It is this logic 1 on an address bus that is used to enable a given, unique address.

Continuing with the detailed description of FIG. 5, with the example of the two-bit binary word 10 at AND gate 82 output, a 1 is stored during frame 1 and then held in flip-flop 91, and during the next frame, frame 2, is gated through AND gate 92 to output terminal 96. This output terminal 96 is connected to a separate address bus which is used to enable the transmission of a unique address, as mentioned above. The address and generation features are described in more detail in connection with FIG. 6 below. It was also noted in the description of FIG. 4 that, while an accumulator stored the binary state for readout, there was another accumulator which was dedicated to storing the next frame of sample pulses. In this preferred embodiment a dual arrangement of flip-flops, such as 91 and 93 in FIG. 5, are used alternately and with alternate output gating, one is storing bits while the other holds the previous frame storage for readout. For example, in the case of the first sample interval, frame 1, a binary 10 was represented by a 1 in flip-flop 91; however, in frame 2 this same flip-flop holds the stored 1 because the input to this flip-flop is inhibited from changing the state. The associated AND gate 92 supplies the stored 1 to an address bus during the entire time of frame 2, thus forming an example of pulse stretching where the original sample, derived in a short time is made to last in an exclusive path for the entire frame time. Each flip-flop which stores a 1 level will be reset for further use at the end of the readout time, which is at the end of the next frame after the storage took place. The time required for $q$ storage intervals is equal to the time for one sample interval multiplied by $q$. This time for $q$ storage intervals is herein referred to as the time per frame.

It has been found both convenient and desirable to make the above-identified frame time equal to the total time allotted for the time axis of the time-frequency matrix where the time from $T_A$ through $T_X$ is equal to the time of the storage frame. It is particularly noted, however, that this does not require that a one-to-one correspondence exists between each interval of the matrix and each sample interval. Thus, $T_A$ could, but need not, equal $T_1$, etc. The pairs of registers or flip-flop circuits illustrated in FIG. 5 and described above, are required in order to permit the simultaneous operations of sequential storage in one set of registers or flip-flops, while the other set is used for the "stretched" readout. Failure to employ either this preferred alternate or dual arrangement or some form of parallel shift registers, results in the loss of $q$ number of sample pulses during the time that the "stretched" readout occurs. The stretching of the shorter duration pulses is an advantage over other systems because a given user information can be transmitted in this digital form within a narrower band of frequencies than has been possible in other systems of multiplexing. It will be appreciated from the foregoing example followed through the circuitry of FIG. 5, that each binary word in each sample interval is uniquely identified. The frame No. 1 pulse at terminal 98 will be seen to be applied to the first flip-flop or register of each pair, and the frame No. 2 pulse at the terminal 99 is applied to the second flip-flop or register of each pair. Similarly, these frame pulses are applied to the output AND gates for the respective flip-flop or registers. Consequently, alternate registers of each pair operate in successive frames to thus accomplish the stretching of the signal pulses, as desired herein. The embodiment herein described and illustrated has processed the two-bit binary word 00 such that an address is transmitted whenever this word occurs. The occurrence of this binary word signifies the simultaneous absence of unipolar pulses at the outputs of paired delta modulators. Therefore, it is to be appreciated that the transmission of a unique address to represent this 00 binary word is not essential inasmuch as the absence of RF bursts could be caused to convey the same information, thus resulting in fewer addresses required and transmitted. Additionally, fewer parts would be required, thereby reducing costs.

It will be noted that the above-described circuitry of FIG. 5 does not contain pulse sign information. For this purpose separate registers or flip-flops 101 and 102, etc., are shown to be connected to the second outputs 71 and 71' of delta modulators 31 and 32. Flip-flop circuit 101 produces an output on line 104 for a 0 input and an output on line 106 for a 1. These lines are connected to address buses as described in connection with FIG. 6.

In a similar manner the polarity or pulse sign registers of the remaining user paths are used in an address matrix which reduces the number of addresses required to send polarity signs for $p$ users per module. For example, if $p$ equals four, then there would be four polarity flip-flops or registers each with two output leads. In this example, there would be dedicated 16 unique addresses for use in sending any possible combination of four flip-flop states from 0000 binary to 1111 binary which represents all possible states of the polarities at any frame time in a module. However, where only one of the 16 addresses would be sent in any given frame, i.e., one of 16 would be "true" out of the 16 possible states, a diode matrix from each of the pairs of flip-flop outputs is the conventional way to cause the selection of the one "true" address in the address matrix. The enabling of a given address is discussed in more detail in connection with FIG. 6.

The greatest number of changes of the slope polarity of the user-input amplitude occurs when the user-input amplitude is at the highest frequency. If this highest frequency is limited by employing user-input low-pass filters with a desired cutoff frequency such that only one change in slope polarity will occur in one time frame, for example, if the limit or cutoff frequency is 5 KHz and the sample rate of the delta modulators is 50 KHz, one change in polarity in five sample sequences is all that would be normally encountered. This is advantageous because in this present invention the unipolar pulses are separated from the sign polarity information to reduce addresses but, if the polarity information had to be sent faster than one per frame, the polarity information would require a separate T-F matrix with wider bandwidth. Such is not the case and therefore it is herein possible to make use of the same T-F matrix for both the unipolar and the polarity information transmission, as described below. In other words, each polarity register stores one change of polarity state per frame and therefore the timing of the stretching circuits, as well as the polarity and the matrix circuits, is compatible in this preferred embodiment, thus reducing parts and cost.

Before proceeding with the description of the circuitry of the present invention, it is convenient to briefly discuss the time-frequency matrix of the present invention in some further detail. In this respect, reference is made to FIG. 7 wherein there is shown a representation of a matrix having a plurality of frequency channels $F_1$ to $F_n$ plotted on the left thereof and time slots $T_A$ to $T_X$ across the top thereof. The total time interval of the matrix is considered to be one frame, and the matrix locations or holes are seen to be numbered from the upper left-hand corner of the illustration of FIG. 7 from 1 to H, which is the total number of holes in the time-frequency matrix. Addressing is herein accomplished by the provision of timed RF bursts occurring in particular matrix holes or locations, as an identification of address and/or information.

Referring now to FIG. 6, there will be seen to be illustrated therein the address assignment matrix 37 with associated output circuitry. This matrix 37 is, in itself, conventionally formed and will be seen to be supplied on the left thereof with matrix timing signals, $T_A$, $T_B$, to $T_X$, the sources of which are not shown in this FIG. 6 but are derived in a manner similar to the circuitry which produces $T_1$, $T_2$, $T_3$, etc., in the description of FIG. 1 above. For further continuity with previous descriptions, it is to be understood that a separate source of the T-F matrix timing signals is necessary only when there is not a one-to-one correspondence between the sampling pulses and the timing pulses which correspond to the vertical columns of the T-F matrix in FIG. 7. In the previous detailed description of FIG. 5 it was mentioned that it was found to be both convenient and desirable to make the frame times equal, i.e., stretching-circuit frame time and T-F matrix frame time; however, there is no requirement for a one-to-one correspondence between the individual sample pulse time intervals and the time intervals in the vertical columns of the T-F matrix. These individual time requirements, as well as other parameters of the system, are evaluated in the description of the factors which influence system performance after the receiver description below. Again referring to FIG. 6, address numbers are shown to be supplied to vertical lines of the matrix from buses identifieid as Bus 1, Bus 2, Bus 3, Bus 4, etc., in conformity to the terminology of FIG. 5. Additional vertical lines of the matrix are connected to digital sign signal inputs which represent the unipolar delta modulator pulse polarities corresponding to lines 104, 106, etc. of FIG. 5.

Before continuing with the description of the address-assignment matrix 37, of FIG. 6, the concept of addressing in a time-frequency division system is briefly discussed. An address is defined as a set of at least two or more locations or holes in a T-F matrix. An address may represent a sample of user input or a sign polarity in the communication of the user information, or in such as a telephone system, it can also be used for telephone supervisory data such as on hook, off hook, dial tone, busy, ring, and other controlling signals which are essential to establishment, completion, identification and maintenance of a calling and called party call. An address is transmitted when RF bursts which correspond to two or more holes in the T-F matrix are caused to be present at the transmitter output. For example, when the assigned address is hole 1 and 3 (see FIG. 7), a timing signal $T_A$ is gated to the source of $F_1$ and thus produces an RF burst in the hole $F_1T_A$ which is the same as hole No. 1. At the same time the timing signal $T_A$ is also gated by the same address bus to the source of $F_3$ and thus hole $F_3T_A$ (hole No. 3) is transmitted. In the receiver, a given user path would have been assigned to use this address and the receiver would, in this user path, accept this address and reject other addresses which are assigned to other user paths.

Figure 6A:
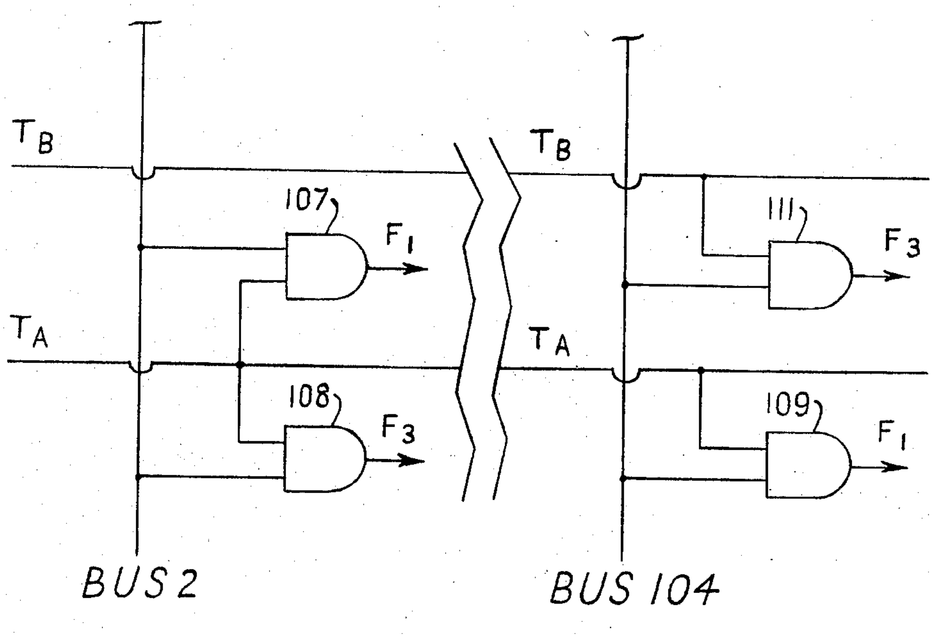
FIG. 6A is a partial schematic illustration of a portion of the address assignment matrix of FIG. 6.

The matrix 37 is conventional insofar as physical configuration is concerned and may, for example, include a plurality of AND gates together with associated diode circuitry limiting return signals and providing for gates as normally required. There is illustrated in FIG. 6A a small portion of a matrix including Bus 2 and Bus 104, together with timing signals $T_AT_B$ as shown. A first AND gate 107 has one input connected to Bus 2 and one input connected to $T_A$. It will thus be appreciated that, with concurrence of a signal in Bus 2 and line $T_A$, there will be produced an output from AND gate 107 which is then applied as described below to produce an RF burst of the frequency $F_1$. Similarly an AND gate 108 has one input connected to Bus 2 and one input connected to line $T_A$ so that the same concurrence of signals will produce an output from gate 108, which is then applied, as described below, to produce an RF burst of a frequency $F_3$. With the wiring of the matrix 37, an output on Bus 2 of FIG. 5 operates in accordance with the T-F matrix of FIG. 7 to produce the address $T_AF_1$, $T_AF_3$, i.e., RF bursts will be caused to occupy holes 1 and 3 of the matrix.

Bus 104, illustrated in FIG. 6A, is shown to be connected, for example, to one input each of AND gates 109 and 111. Line $T_A$ is connected to the other input of gate 109 and line $T_B$ is connected to the other input of gate 111. It will thus be seen that, with this matrix wiring, a polarity signal on Bus 104 will, during one time frame, operate gate 109 during time $T_A$ and will operate gate 111 during the time slot $T_B$. Gate 109 is shown to be connected to generate an RF burst at frequency $F_1$ and gate 111 is shown to be connected to generate an RF burst at frequency $F_3$. This then provides for production of the address $T_AF_1$, $T_BF_3$.

It will be appreciated that the manner in which the matrix 37 of FIG. 6 is wired determines the address assigned to any bus signal and thus the illustration of FIG. 6A is only exemplary.

Continuing with the operation of matrix 37 of FIG. 6, a conventional crosshatching of address buses with timing buses is accomplished through the interconnecting diodes or gates which are connected to assigned junctions in the crosshatching to cause a unilateral flow of the logic 1 on any address bus to an appropriate RF generator and at the correct time to produce the desired burst in the address. For example, if the 10 paired two-bit binary word, previously described in the pulse stretching circuitry, is stored and sent on address Bus 2 connected to terminal 96 in FIG. 5, a logic 1 would appear, during the stretched pulse interval, on this address bus. This logic 1 is then fed through the appropriate gates such as gate 112 of FIG. 6, to the oscillator 113 of FIG. 6, which is to be turned on. It is also to be noted that this junction gating is ANDed with the proper timing signals, enabling both the logic 1 and the timing signal to produce a timed gate to the appropriate RF generator. In the example of addressing above, an address consisting of holes 1 and 3 was used; if the same example is assumed at this point, Bus 2 with a logic 1 would pass through the junction gating (not shown in matrix 37 drawing) along with the ANDed timing signal $T_A$ to the first RF oscillator, resulting in the transmitting of RF for the time interval of $T_A$. At the same time, $T_A$, another junction gate would be connected and permitting ANDing of the same logic 1 to the third RF oscilllator, thus transmitting hole No. 3.

Considering the generation of RF bursts somewhat further, it is again noted that the RF oscillators, such as 113 of FIG. 6, are operated by gate circuits such as gate 112 of FIG. 6, at the time determined by the concurrence of time and bus signals in the matrix and for the period of these individual timing signals. Each of the oscillators have the outputs thereof connected to the input of the amplifier 39 that, in turn, has the output thereof connected to the transmitter output terminal 41. In addition, there is provided, for each of the oscillator circuits, sensing means in order to prevent undesired interaction of RF bursts. In FIG. 6 there is illustrated a sensor 116 connected to a receiver terminal 45 for sensing the presence of a frequency $F_1$ thereat. This sensor 116 is connected to the gate 112 to maintain the gate in an inoperative condition during the sensing of frequency $F_1$ by sensor 116. The sensor also provides for connection of the sensed RF burst at frequency $F_1$ back to the input or the output amplifier 39. This then provides for returning a received RF burst instead of generating the burst. Substantial advantages are achieved in this manner as further discussed below.

Figure 8:
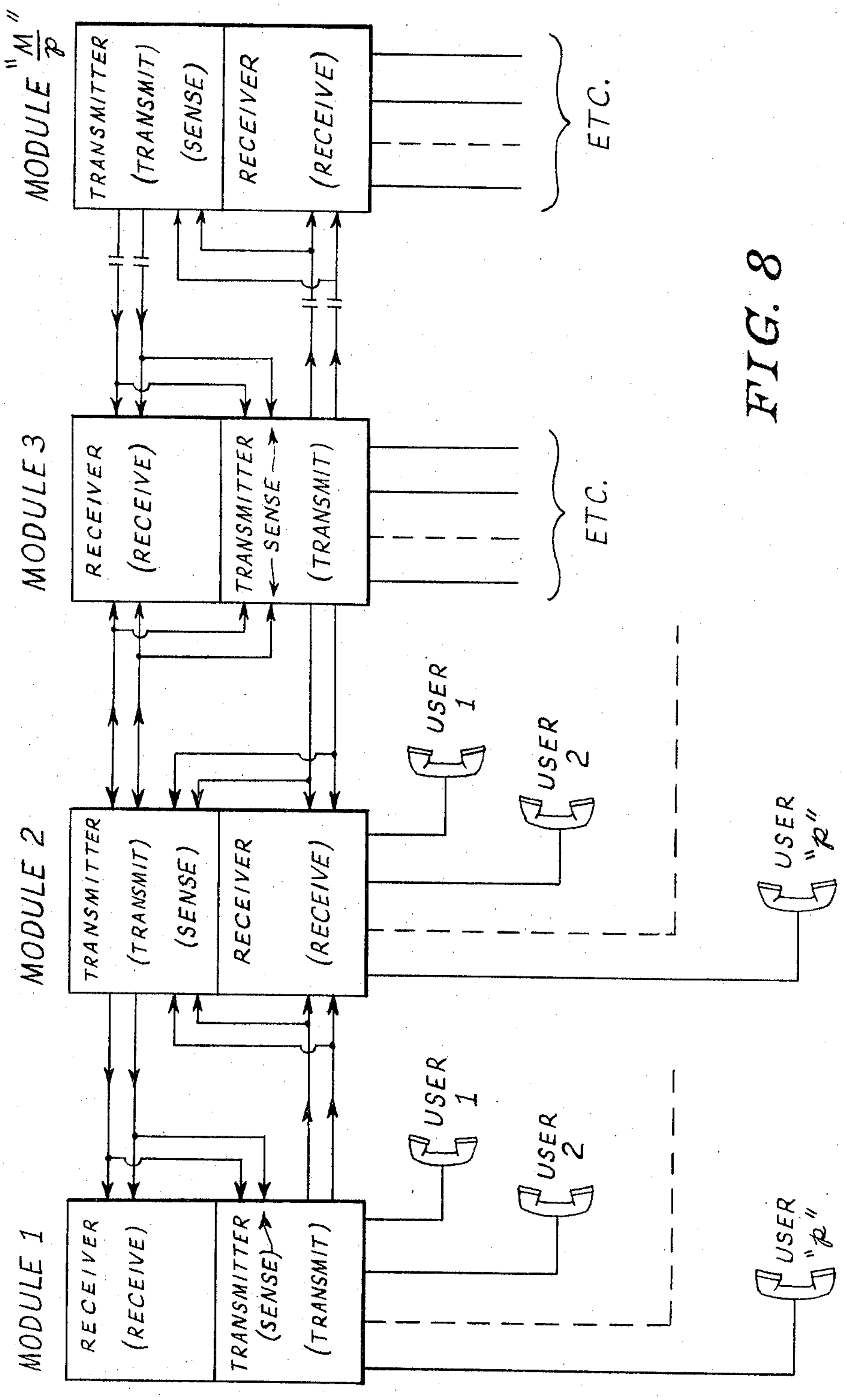
FIG. 8 is a schematic block diagram of a plurality of modules forming a system in accordance with this invention.

Before proceeding with a discussion of the receiver, the concept of transmitter sensing is described and explained with reference to FIGS. 6 and 8. Transmitter sensing is employed in the present invention in order to prevent any undesired interaction of more than one user's addressing RF bursts which could lead to a cancellation of these RF bursts if the medium over which one user's burst traveled is an odd half wave length away from another user's burst. Other phasing, fading and adding problems are also avoided. In order to prevent the condition which could be caused by modules being "dropped" along the medium at such intervals of length which would give rise to phasing problems, transmitter sensing and gating have been incorporated. An example serves to describe how such a sensing and gating operation is utilized to eliminate the undesired interaction mentioned above. In FIG. 8 a block diagram of a typical modularization of the system is shown. Note in this Figure that the received input of each module also is coupled to the sensor of each transmitter associated with the receiver. Before tracing this sensing and operation thereof in detail, it is to be noted that it has been found to be unnecessary to separate the receiver bursts from those of the transmitter because, anywhere in the system, if an RF burst occurs at a given time interval in the T-F matrix, part of another address from another user could possibly occupy this same matrix hole. In such cases where a hole is occupied by part of an address from more than one user, there is no detection or interference problem experienced, provided a false address is not present (false addresses are described in detail below), and additionally, provided that the present sensing and gating techniques is employed. The function of the sensor is to sense the incoming signals to see if any timed RF bursts are occurring at the time the transmitter is required to send a burst at the same time and frequency. If the foregoing occurs, the incoming RF is detected by the sensor which inhibits the associated oscillator gate before the address bus and timing signal can gate on an RF oscillator. Somewhere in the system a convenient break in this loop of sensing is incorporated by, for example, using bidirectional sensors in one of the modules to prevent a ringing or oscillatory loop from building up.

The receiver of the present invention operates in substantially the reverse manner from the transmitter. Referring now to FIG. 2, there will be seen to be illustrated an input terminal 151 receiving a composite input signal comprised of RF bursts of different frequency at different times in accordance with the matrix control over signal transmission. In FIG. 2 there is illustrated a first receiver subgroup 152, with subsequent receiver subgroups 153 and 154 merely being generally indicated. Input terminal 151 is connected at subgroup 152 to a plurality of band-pass filters 156, 157 and 158. The input terminal is also connected to a synchronizing signal circuit 159 that is, in turn, connected to a timing-pulse gate circuit 161 applying signals to an address decoder matrix 162. As stated above in the discussion of synchronizing circuitry 44 shown in FIG. 1, it is to be assumed that synchronizing signals are derived from the composite received signal in accordance with one of several methods generally known in the art. The band-pass filters 156 to 158 are set to pass the system frequencies $F_1$, $F_2$ to $F_n$ and the envelopes of these RF bursts are then applied to separate horizontal lines of the matrix 162 with the timing pulses applied to the vertical lines so that the output of the matrix 162 is consequently decoded. This output is applied to concurrent-to-sequential decoders 163 and 164 for each delta pair. From the decoder 163 there are produced sequential pulses applied to a pulse-sign selector 166 and also sign signals applied to a slope polarity decoder 167. The slope polarity decoder has plus and minus outputs applied to the pulse sign selector so that the output of this pulse sign selector thus becomes bipolar pulses corresponding to the bipolar pulses at the output of the differentiator of the transmitter delta modulator. These bipolar pulses are then integrated to return the digital signals to analog in an integrator 168 and are then supplied through a low-pass filter 169 to a user No. 1 output terminal 171.

Figure 9:
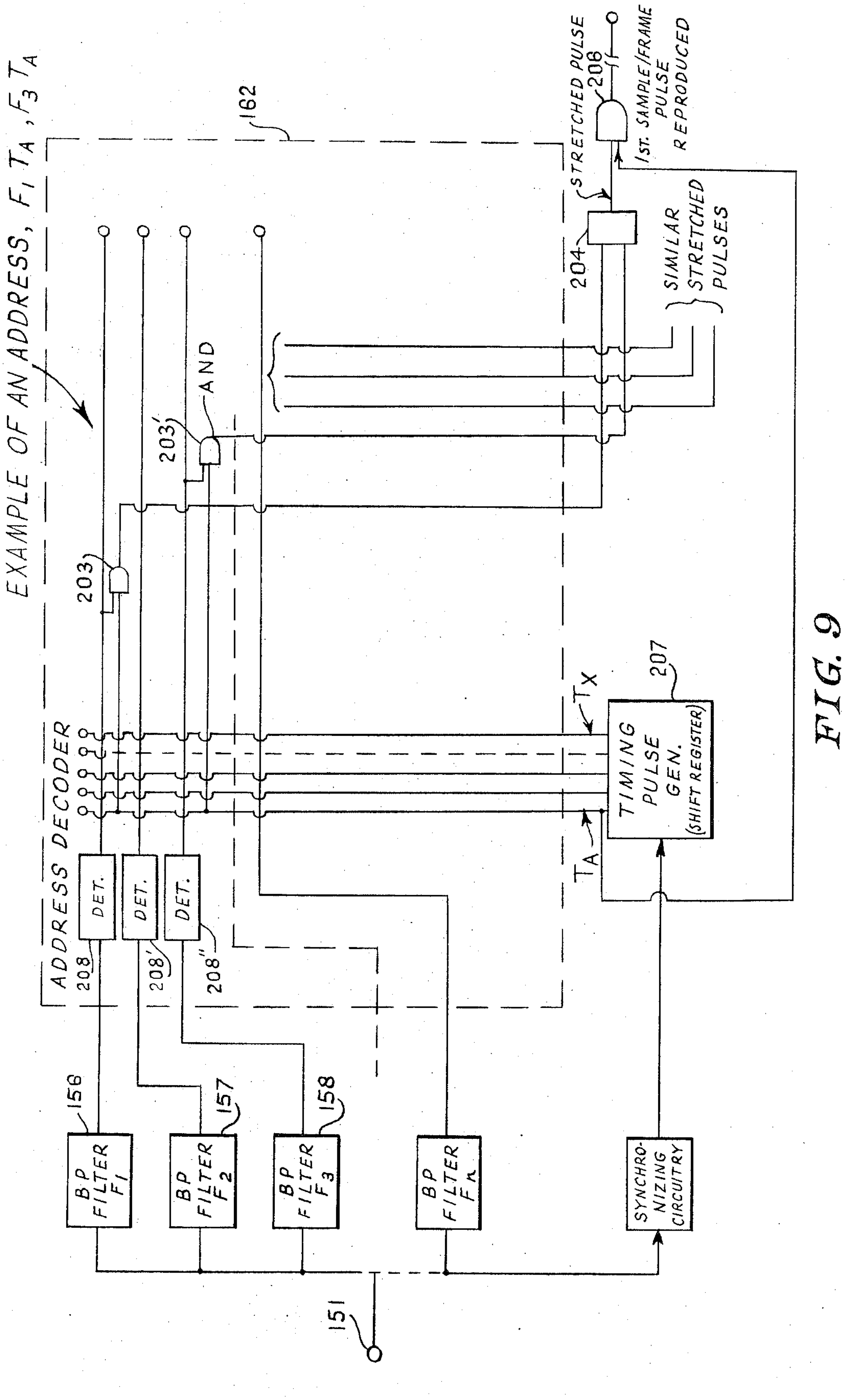
FIG. 9 is a diagramatic illustration of an address decoder and connections as may be employed in the receiver of FIG. 2.

For further details about the processing of the received signals, the following description is taken in connection with FIG. 9, where the address decoder 162 contains essentially the reverse configuration of the one described above in matrix 37 of FIG. 6. The envelope of RF bursts at the outputs of a plurality of detectors 208, 208', etc., are applied to horizontal buses, and at the junctions of the vertical lines carrying the timing pulses there are AND gates 203 and 203' wired to receive the desired matrix timing signals on one input of each gate and the RF burst on the other input of the same gate, thus providing, at the outputs of the AND circuits, one part of the decoded address. The remainder of the address is decoded in the same way and is then applied to a flip-flop 204, where the output of this flip-flop is an exact reproduction of each stretched pulse. Then, each stretched-pulse line identifies or represents a given sample time and, in conjunction with an AND gate 206, the stretched pulse is time-gated by a time pulse to reproduce, in this AND gate output, the desired unipolar pulse in exactly the same shape and duration as it occurred at the output of the associated transmitter delta modulator output. The time pulses $T_A$ to $T_X$ are generated by a pulse generator 207 having an $f_\Delta$ input from the receiver input 151.

Figure 10:
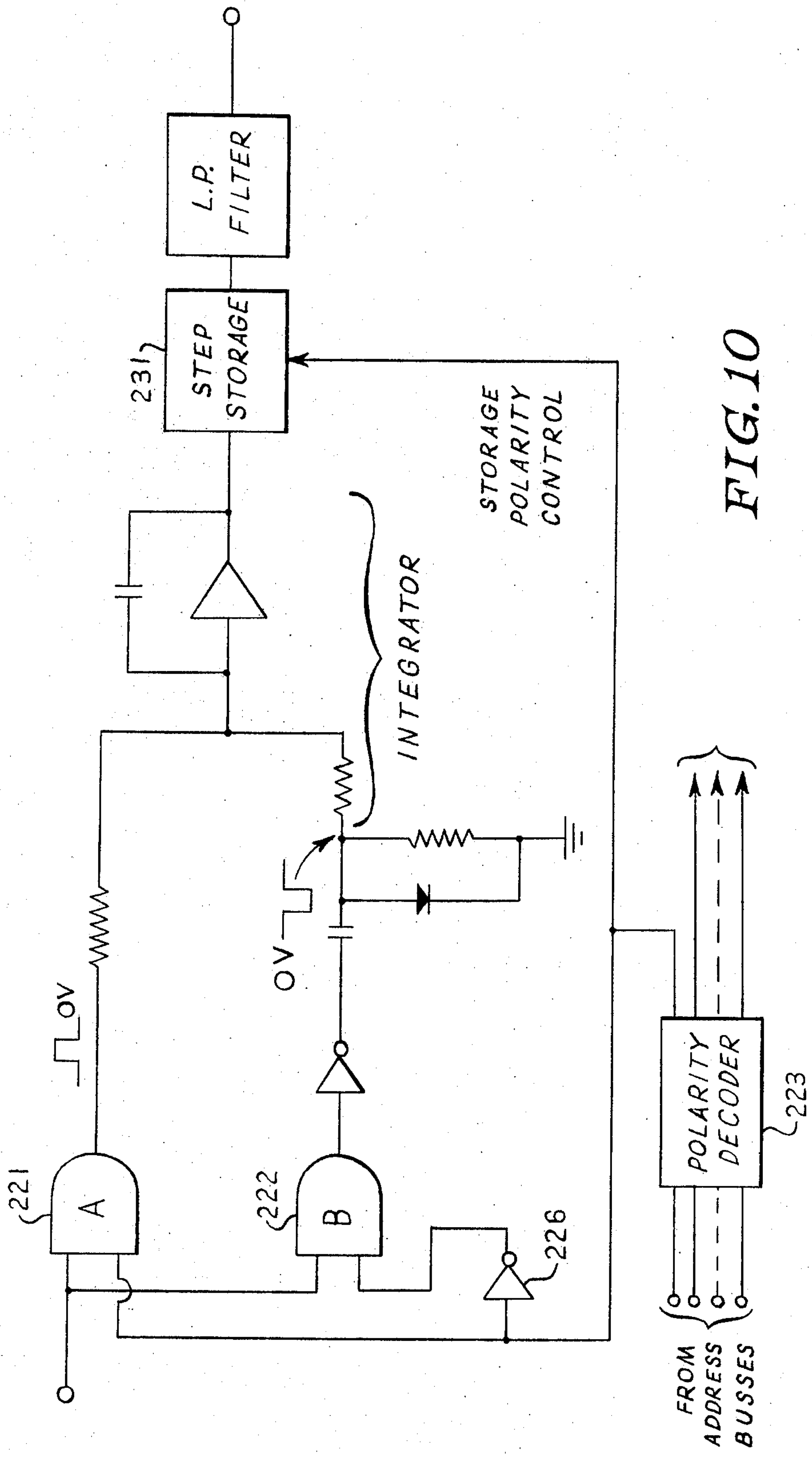
FIG. 10 is a schematic illustration of a pulse-sign selector and integrator as may be employed in the receiver of FIG. 2.

Following the address decoding, it remains in the processing of the received signal to re-establish the bipolar pulses, integrate these and low-pass filter the user received input, to reproduce the original user input at the output of the user path. To accomplish this, circuitry such as that illustrated in FIG. 10 is employed. Unipolar pulses are applied to one input of each of two AND gates 221 and 222. The other input of these gates is derived from a polarity decoder 223, where internally, the decoder contains wired OR gates to decode each module polarity which has been coded in the transmitter. A dedicated line for each user path polarity is fed to the other input of AND gate 221, and through an inverter 226 to AND gate 222, providing polarity sensitive gating at the integrator input where these signals are reproduced in a form which is similar to the type of bipolar pulse that is used in the transmitter delta modulator error detection loop and, when integrated, is fed to a step storage circuit 231. The storage circuit contains a capacitive charging and discharging feature, receiving the integrated steps and controlling the direction of charge in accordance with the slope of the original user input as controlled by the polarity signal at the step storage input 231. With added low-pass filtering, the original user input is faithfully reproduced in the receiver output.

As indicated in the general discussion above, the other user paths would, in this same module, make use of the matrix and then have separate, dedicated gates and circuitry such as that which has just been described above.

It will be appreciated that the present invention employs a particular time-frequency maatrix with certain combinations of delta modulators, for example, and the stretching of short duration sample pulses to achieve a significant advance in the art. In this respect, it is of interest to note certain significant factors which influence system performance. The first of these factors is the consideration of the maximum number of available, unique addresses in a given size of time-frequency matrix. The size of a matrix is specified in terms of the numbers of holes in it, i.e., the product of the number of frequency channels $F_n$ multiplied by the number of time slots $T_X$. The number of available addresses depends on the number of RF bursts used in transmitting each address. For example, in the case of a simple matrix containing six holes and for which two bursts are used for each address, the number of addresses is fifteen. This number is arrived at by computing the number of combinations of six things taken two at a time. In general, if H is the number of holes in the matrix, N is the number of pulses or bursts per address, and A is the number of possible addresses, $$A=\binom{H}{N}=\frac{H!}{(H-N)!N!}$$

This relationship assumes that a synchronized system is employed.

Figure 7:
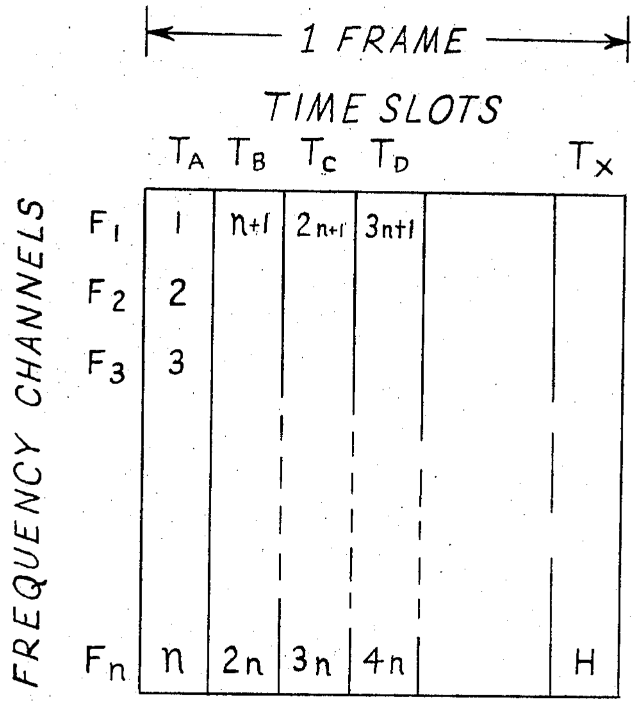
FIG. 7 is an illustration of a time-frequency matrix as employed in the present invention.

The specification of an address is done by designating which holes in the matrix are to be occupied by pulses. Said designation is aided by numbering the holes 1 through H, as shown in FIG. 7. The fifteen available addresses in a six-hole matrix can be thus specified by the following pairs of numbers: 12, 13, 14, 15, 16, 23, 24, 25, 26, 34, 35, 36, 45, 46, 56. It is to be appreciated that the total number of addresses actually needed for the communications system which is the subject of the present invention, as well as the total number of RF bursts in a given frame needed for transmitting modulation and sign information, can be minimized by appropriate choice of subgroup or module parameters.

In order to optimize the parameters, the following basic factors are to be related: (1) minimize the number of storage devices; (2) minimize the number of frequency channels in H; (3) minimize the probability of occurrence of false addresses; and (4) minimize bandwidth B.

The system of the present invention may be operated in accordance with the following example:

EXAMPLE

1. Bandwidth of composite output $B = 1.2$ MHz
2. Number of users per system $M = 50$
3. Number of pulses per address $N = 2$
4. Number of subgroups $= 50/p$
5. Number of stored delta samples per frame $= q$, $(3 \leq q \leq 6)$
6. Number of users per subgroup $= p$, $(2 \leq p \leq 5)$ A system employing the foregoing limitations or constraints includes the following advantages as compared to existing communications systems:

1. More users per given bandwidth are provided for than existing systems.
2. If desired, a wider pass band per user may be employed compared to such as PCM where only 3 KHz is allotted.
3. By utilizing digital storage registers, a high delta sample rate is reduced to a lower transmission rate.
4. T carrier telephone cable can be used as a transmission medium, eliminating the need for a special design of medium.
5. Regenerative repeating is practical and is superior to other systems because discrete frequencies are regeneratively repeated rather than a wide band of freqencies required for repeating a pulse.
6. The modularization or subgrouping of user inputs into small mechanizations or embodiments permits economical "drop" of modules anywhere along the transmission medium.
7. Within a given bandwith constraint, and for a given number of users per system, this new system has approximately a two-to-one advantage, e.g., less pulses per frame transmitted simultaneously than for similar transmissions from such as a RADA system employing many addresses per person. This is a significant advantage because there is a certain amount of "self-interference" noise generated in both this new system and in other systems, such as RADA, where time-frequency division multiplexing is employed. The probability of this self-interference increases exponentially in rate-of-occurrence of noise bursts when the number of simultaneously transmitted RF bursts is increased.

As noted above, systems such as RADA and the present invention experience a certain amount of self-interference, and an explanation of this self-interference noise is believed important to a complete understanding of the present invention. In summary, this self-interference noise is caused by the detection in the receiver of one or more false addresses. The source of these false addresses is inconspicuous. This source is explained by way of an example. Assume that there is a simple matrix consisting of three frequencies and two time intervals, making up a 6-hole matrix, as in the foregoing example. The generation of a false address in the receiver can be visualized if it is assumed further that:

1. address No. 1 is assigned holes 1 and 4.
address No. 2 is assigned holes 2 and 4.
address No. 3 is assigned holes 1 and 5.

2. at a certain instant, addresses No. 2 and No. 3 are being sent simultaneously, causing holes 1, 2, 4 and 5 to be simultaneously occupied. In this case the receiver, which is preprogrammed to gate certain unique addresses to given users, would properly decode and process addresses No. 2 and No. 3; however, since holes 1 and 4 are also occupied, the receiver gating would detect that address No. 1 was present, when this address was not transmitted. This is an error-producing condition which occurs not only in the receiver of this new system but also in the receivers of any form of RADA system. As each false address is "set up" by the simultaneous occurrence of certain combination of addresses, a self-interference noise spike is produced in the user's path in the receiver.

It has been stated above that subgrouping the delta modulators in pairs provides for more efficient coding of the modulator output pulses for storage and transmission. Said subgrouping in pairs may, in fact, provide the optimum arrangement when considerations of modularization, cost, and flexibility are introduced. However, it is particularly noted that the invention is not confined to subgrouping in pairs. Subgroups of three or more may be found to have advantages when additional considerations of cost, etc., are introduced. In addition, an advantaage is to be gained through modularization, i.e., combining the subgroups together in such a manner that the polarity information from each user in the module is combined to form one digital word. This advantage is in addition to that arising from module "drops" along a transmission medium and arises from the fact that a minimum number of RF bursts are needed to transmit one digital word compared to p-times as many bursts if all $p$ users in the module were transmitting separately. The advantage gained through subgrouping modulation information arises for the same reason.

The following demonstrates the advantage of subgrouping and modularization when only the factors of the number of addresses and the number of transmitted pulses are considered. The number of required addresses should be kept to a minimum since the amount of circuitry needed to encode and decode the modulation increases as the number of required addresses increases. Furthermore, the size of the time-frequency matrix would have to be increased to accommodate larger numbers of required addresses. The number of pulses in any one frame should be kept to a minimum because the probability of a false address being transmitted increases with the number of transmitted pulses.

For the purpose of demonstrating the advantages of the present system, assume that equal weight is given to the importance of minimizing the number of required addresses and the number of transmitted pulses. In order to quantify the demonstration there is defined a "figure of merit," as follows:

$$\phi = \text{const.}/a_1 N_1$$

For convenience, let const. = 100 where $a_1$ = number of required addresses per user $N_1$ = number of transmitted pulses per user Let $r$ = number of user channels subgrouped together for modulation storage and transmission ($r = p$/integer)

$p$ = number of user channels in a module $q$ = number of delta samples per frame Then $2^r q$ = number of required addresses needed for modulation per subgroup $2^r q\ p/r$ = number of required addresses needed per module $2^p$ = number of required addresses needed for sending polarity.

Hence, $(2^r q\ p/r + 2P)$ = total addresses per module per frame.

Now each transmitted address requires at least two pulses or RF bursts on the time-frequency matrix regardless of whether it is a modulation or a polarity address. Therefore, $(2q\ p/r + 2)$ = total number of transmitted pulses per module per frame (assuming two pulses per address).

In order to compute the number of addresses or pulses per user the above expressions must be divided by the number of users per module (which is equal to p):

For $r = p$, (no subgrouping within module)

$$a_1 = 2^p(q+1)/p \qquad N_1 = 2(q+1)/p$$

For $r = 2$, (subgrouping in pairs; $p = 2, 4, 6, \ldots$)

$$a_1 = (2qp + 2^p)/p \qquad N_1 = (qp + 2)/p$$

For $r = 3$, (subgrouping in threes; $p = 3, 6, 9, \ldots$)

$$a_1 = (8/3qp + 2^p)/p \qquad N_1 = (2/3qp + 2)/p$$

Therefore, $$\phi_{r=p} = 100p^2/2^{p+1}(q+1)^2$$

$$\phi_{r=2} = 100p^2/(2qp + 2^p)(qp + 2)$$

$$\phi_{r=3} = 100p^2/(8/3qp + 2^p)(2/3qp + 2)$$

For comparison, $m$-ary RADA (where $m$ adresses are assigned to each user and polarity information is transmitted using two addresses and two pulses) has $$a_1 = 2^q + 2 \qquad N_1 = 4$$

$$\phi_{RADA} = 100/(2^q + 2)4 = 12.5/(2^{q-1} + 1)$$

The following table shows the "figure of merit" for various values of $p$, $q$, and $r$ and also for RADA:

| q | r | p=2 | 3 | 4 | 5 | 6 | 8 | 9 | RADA |
|---|---|---|---|---|---|---|---|---|---|
| | p | 5.5 | 6.2 | 5.5 | 4.3 | 3.1 | | | |
| 2 | 2 | 5.5 | | 5.0 | | 2.9 | 1.2 | | 4.2 |
| | 3 | | 6.2 | | | 3.8 | | 1.0 | |
| | p | 3.1 | 3.5 | 3.1 | 2.4 | 1.8 | | | |
| 3 | 2 | 3.1 | | 2.9 | | 1.8 | 0.8 | | 2.5 |
| | 3 | | 3.5 | | | 2.3 | | | |
| | p | 2.0 | 2.3 | 2.0 | 1.6 | 1.1 | | | |
| 4 | 2 | 2.0 | | 1.9 | | 1.2 | 0.6 | | 1.4 |
| | 3 | | 2.3 | | | 1.6 | | | |
| | p | 1.4 | 1.6 | 1.4 | 1.1 | 0.8 | | | |
| 5 | 2 | 1.4 | | 1.3 | | 0.9 | 0.5 | | 0.7 |
| | 3 | | 1.6 | | | 1.1 | | | |
| | p | 1.0 | 1.2 | 1.0 | 0.8 | 0.6 | | | |
| 6 | 2 | 1.0 | | 1.0 | | 0.7 | 0.4 | | 0.4 |
| | 3 | | 1.2 | | | 0.9 | | | |

It will be noticed that under the given assumptions of equal weight for minimized addresses and pulses, the combination of $q = 2$, $p = 3$, and $r = p$ or 3 yields the highest value of $\phi$. However, as pointed out above, other considerations may indicate that a larger value of $q$ (more delta samples per frame) introduces other advantages. It will be further noticed that the smaller values of $p(p<5)$ yield values of $\phi$ greater than those of $m$-ary RADA systems of equivalent capacity.

What is claimed is:

1. A communication system having a plurality of inputs comprising
 a plurality of first means sampling the change in signals at respective inputs simultaneously in repetitive intervals and producing for each input first pulses representing signal change and second pulses representing direction of change between successive intervals,
 second means coupled to the output of said first means for combining pulses from a plurality of inputs to form binary words,
 said second means including means registering and reading out said first pulses as said binary words to increase the readout time compared to sampling interval,
 an address assignment matrix wired to receive said binary words, and
 output means connected to said matrix for transmitting predetermined frequency bursts of energy at particular times as determined by said matrix as signals to a transmission medium that are decipherable into original input signals.

2. The system of claim 1 further defined by
 the means sampling input signals producing bipolar pulses of fixed amplitude,
 means converting said bipolar pulses to unipolar pulses and generating said second pulses from said bipolar pulses as unipolar polarity pulses,
 said means combining pulses including logic circuitry producing the equivalent of a different word for each combination of unipolar pulses, and
 means coding said polarity pulses for transmission.

3. The system of claim 1 further defined by said output means including means generating a plurality of fixed frequencies connected to the output of said address assignment matrix for producing for transmission frequency bursts for fixed times at particular times as determined by matrix energization.

4. The system of claim 3 further defined by frequency sensing means connected to the transmission medium of the system and controlling said means generating a plurality of fixed frequencies for disabling the generation of a frequency at the time it is already present on the transmission medium.

5. An improved communication system comprising
 a transmitter connected to user inputs and including sampling means generating a fixed amplitude unipolar information pulse for each input variation in excess of a predetermined minimum during successive sampling periods of a sampling frame and polarity pulses identifying the direction of change of input during each sampling period, logic circuitry connected to receive information pulses from groups of inputs for each sampling period and producing an output pulse on a separate line for each combination of pulses and absences of pulses of each group of inputs for each sampling period, an address assignment matrix connected to receive timing signals and connected to the separate output lines of said logic circuitry and producing matrix output signals, means coding said polarity pulses, and means generating a plurality of fixed frequencies connected to said matrix output signals and coded polarity pulses for producing particular frequency bursts at particular times as transmission addresses at a transmitter output;
 a transmission medium connected to the output of said means generating a plurality of fixed frequencies; and
 a receiver having an input connected to said transmission medium and outputs connected to user outlets and including an address decoder matrix coupled to the receiver input and connected to decoding circuitry for reconstructing original user inputs and applying same to selected user outlets.

6. The system of claim 5 further defined by said transmitter including means generating matrix timing pulses applied to the matrix whereby signals to said means generating different frequencies occur at times determined by concurrence of logic circuitry outputs and timing pulses at said matrix.

7. The system of claim 5 further defined by said sampling periods comprising a plurality of successive short time periods in successive time frames with each time frame defining the time duration of all time slots in said address assignment matrix, and each of said logic circuitry outputs persisting for a complete time frame whereby the binary words are time-frequency coded in said matrix.

8. The system of claim 5 further defined by said sampling means including means generating one bipolar pulse for a variation of each user input by more than a predetermined amount from one sampling period to the next with the pulse polarity being determined by the direction of change in amplitude of user input, a first trigger means producing first unipolar pulses from said bipolar pulses and second trigger means producing second unipolar pulses from said bipolar pulses identifying the original polarity of said first unipolar pulses, means applying said first pulses to said logic circuitry for production of said outputs and means applying said second unipolar pulses to said matrix for coding and transmission to said receiver.

9. The system of claim 5 further defined by
 the logic circuitry of said transmitter being connected to groups of two of the sampling means for producing two-bit binary words for each sampling period, each group of said circuitry including four storage and readout registers with each having paired flip-flop circuits alternately operable by connection to a sampling frame timing pulse source for producing from only one register per sampling frame an output pulse lasting the duration of the frame and applied to a unique line of said matrix.

10. The system of claim 5 further defined by said receiver having at the input thereof a plurality of bandpass filters separately passing the frequencies of said fixed frequencies for energizing separate lines of the receiver matrix.

11. The system of claim 5 further defined by
 a separate delta modulator coupled to each user input through a band limiting filter and receiving timed sampling pulses for producing said information pulses and polarity pulses,
 a plurality of AND circuits for each delta modulator with one input of each AND circuit connected to the information output of said delta modulator and another input of each AND circuit connected to receive a separate sampling pulse whereby said AND circuits produce pulses representing information pulses in separate sampling periods, said logic circuitry generating a pulse on a separate line for each possible combination of pulses and absence of pulses of each group of inputs for each sampling period, a storage and readout register connected in each of said separate lines and connected to receive a pulse at the beginning of each sampling frame for storing a received pulse and reading out such pulse for the next complete sampling frame, and matrix lines connected one to each register readout for energization for a complete sampling frame for each received pulse.

12. The system of claim 11 further defined by means applying sampling pulses to said matrix for producing signals from predetermined combinations of register readouts and times for operating said means generating fixed frequencies.

13. A transmitter for a communication system having a plurality of input terminals adapted to receive band width limited user inputs and a single output terminal adapted for connection to a transmission medium comprising a plurality of delta modulators connected one to each input terminal and receiving sampling pulses defining sampling periods and having a repetition rate in excess of twice the maximum input frequency for producing information pulses identifying input amplitude change in excess of a predetermined minimum between successive sampling pulses and producing polarity pulses identifying the direction of such change to thus digitalize the inputs, means connected to the outputs of each of said delta modulators and to said sampling pulses for producing a pulse in a separate line for each information pulse in a separate sampling period of a plurality of periods comprising a time frame, means combining groups of said separate lines including logic circuitry producing an output on separate buses for each combination of states on the combined lines for each sampling period in said time frame, storage and readout means connected in each of said buses for extending a signal therein for a complete time frame, an address assignment matrix having rows connected to receive matrix time signals comprising a time frame and columns connected to said storage and readout means with output lines energized by matrix concurrence of predetermined matrix time signals and bus energization as unique address signals, and means generating a plurality of different fixed frequencies connected to matrix output lines for generating frequency bursts at particular times as addressed information applied to said output terminal.

* * * * *